US012552910B2

(12) United States Patent
Brons et al.

(10) Patent No.: US 12,552,910 B2
(45) Date of Patent: Feb. 17, 2026

(54) METHOD TO ENABLE RECYCLING OF POLYESTER WASTE MATERIAL AND A SYSTEM FOR APPLYING THE METHOD (71) Applicant: CURE TECHNOLOGY B.V., Emmen (NL)

(72) Inventors: Marco Brons, Rheden (NL); Markus Anton Ruesink, Zevenaar (NL); Johan Albert Frans Kunst, Maastricht (NL); Johannes Gerhardus Niels Hoffard, Arnhem (NL); Layo Van Het Goor, Wezep (NL); Mike De Lange, Hoogeveen (NL); Bram Wolfgang Schmidt, Veenhuizen (NL); Jan Jager, Groningen (NL)

(73) Assignee: Cure Technology B.V., Emmen (NL)

( * ) Notice: Subject to any disclaimer, the term of this patent is extended or adjusted under 35 U.S.C. 154(b) by 624 days.

(21) Appl. No.: 18/010,157

(22) PCT Filed: Jul. 1, 2021

(86) PCT No.: PCT/EP2021/068125
§ 371 (c)(1),
(2) Date: Dec. 13, 2022

(87) PCT Pub. No.: WO2022/003084
PCT Pub. Date: Jan. 6, 2022

(65) Prior Publication Data
US 2023/0242733 A1 Aug. 3, 2023

(30) Foreign Application Priority Data
Jul. 2, 2020 (EP) .................................. 20183733

(51) Int. Cl.
C08J 11/24 (2006.01)
(52) U.S. Cl.
CPC ............ C08J 11/24 (2013.01); C08J 2367/02 (2013.01)
(58) Field of Classification Search
USPC ....................................................... 521/48.5
See application file for complete search history.

(56) References Cited

U.S. PATENT DOCUMENTS

| 6,410,607 B1 * | 6/2002 | Ekart ....................... C08J 11/24 521/48.5 |
| 2005/0096482 A1 | 5/2005 | Tamada et al. |
| 2006/0074136 A1 | 4/2006 | Smith et al. |
| 2018/0051156 A1 | 2/2018 | Foley et al. |

FOREIGN PATENT DOCUMENTS

| EP | 4341336 B1 * | 1/2025 | ............ B01J 31/04 |
| JP | 2002-332379 A | 11/2002 | |
| JP | 2003-55300 A † | 2/2003 | |
| JP | 2004-196880 A | 7/2004 | |
| JP | 2005-511878 A | 4/2005 | |
| JP | 2005-171138 A | 6/2005 | |
| JP | 2005-527650 A | 9/2005 | |
| KR | 1999-0042657 A | 6/1999 | |
| KR | 10-2012-0133548 A † | 12/2012 | |
| KR | 10-1281726 B1 | 7/2013 | |
| KR | 10-1303819 A | 9/2013 | |
| KR | 10-2019-0077807 A † | 7/2019 | |
| WO | 03/051958 A1 | 6/2003 | |
| WO | 03/064510 A1 | 8/2003 | |
| WO | 2019/053392 A1 | 3/2019 | |

OTHER PUBLICATIONS

J.D. Patterson, Continuous Depolymerization of Poly(ethylene terephthalate) via Reactive Extrusion, Mar. 28, 2007.
Patterson et al., Melt Glycolysis of Poly(Ethylene Terephthalate) using CO2-Assisted Extrusion, https://folk.ntnu.no/skoge/prost/proceedings/aiche-2006/data/papers/P66235.pdf, at an academic conference, Nov. 14, 2006.

* cited by examiner
† cited by third party

Primary Examiner — Terressa Boykin
(74) Attorney, Agent, or Firm — Richard M. Goldberg (57) ABSTRACT A process for recycling a stream of polyester waste material by depolymerising the polyester by alcoholysis, includes first and second consecutive stages of depolymerisation, in which the polymer waste material is subjected in a continuous manner, in the first stage, the polyester waste material is continuously fed to an extruder operated at a temperature above the polyester melting temperature, while a first amount of alcohol is co-fed to the extruder, to produce a fluid mixture including a melt of the at least partly depolymerised polyester, and in the second stage, the fluid mixture is continuously fed to a continuously stirred tank reactor (CSTR) operated at a temperature above the polyester melting temperature, while co-feeding a second amount of alcohol to the CSTR, a residence time in the CSTR being used to provide at the CSTR outlet a continuous stream of polyester depolymerised into an oligomeric ester.

15 Claims, 2 Drawing Sheets

METHOD TO ENABLE RECYCLING OF POLYESTER WASTE MATERIAL AND A SYSTEM FOR APPLYING THE METHOD

GENERAL FIELD OF THE INVENTION

The invention pertains to the field of recycling polyester waste material, in particular material comprising semi-crystalline polyester such as polyethylene terephthalate (PET), and to systems for applying a recycling process.

BACKGROUND OF THE INVENTION

Polyester, such as PET as commonly used for soda bottles and yarn materials for producing textiles, is commonly recycled. The post-consumer polyester recycling industry started as a result of environmental pressure to improve waste management. The other aspect that acts as driving force for polyester recycling industry is that polyester products have a slow rate of natural decomposition. Many polyesters are non-degradable plastics in normal conditions since there is no known organism that can consume its relatively large molecules. Complicated and expensive procedures need to be operated in order for polyester to degrade biologically.

The first recycling effort of polyester waste material (i.e. post-consumer polyester objects or material) in the world was in the 1970's but the development of adequate recycling processes evolved quickly. As an example, the total consumption of PET in Australia for the year 2000 was 88,258 tons, in which 28,113 tons were recovered demonstrating a recovery rate of about 32%. Many researchers reported that in order to achieve successful PET recycling, PET flakes should meet certain minimum requirements. The major factor affecting the suitability of post-consumer PET flakes for recycling is the level and nature of contaminants present in the flakes. Minimizing the amount of these contaminants leads to better rPET (i.e. recycled PET) quality. PET is contaminated with many substances such as acid producing contaminants, water, colouring contaminants, acetaldehyde and other contaminants such as detergents, fuel, pesticides, etc. due to the use of PET bottles for storing these substances.

Various distinct types of processes have been applied in order to recycle polyester waste materials, each having their pros and cons.

A first class of processes for recycling polyester waste material is so-called energetic recycling such as pyrolysis and carbonization. Pyrolysis of polyester waste was first described in the early 1980's. It is an alternative to PET disposal in landfills. In general, polyester waste is pyrolysed without further purification of the plastic waste. The majority of pyrolyses are conducted to produce aliphatic and aromatic hydrocarbons as an alternative for fossil fuels or as a source for chemicals. Carbonization is a second method of pyrolyzing polyester waste materials.

A second class of processes for recycling polyester waste material is the mere sorting of the polyester waste material, followed by use of the sorted materials as additive in stone mastic asphalt, cementitious materials, mortars or concrete composites. Since polyester waste may be supplied in mixtures with other polymers, the polyester material has to be separated from these polymers prior to re-processing. Therefore, several methods have been developed including froth flotation, wet shaking table, swelling or thermo-mechanical procedures Next to this, there is a class of processes that are based on (thermo-) mechanical methods to recycle polyester waste material. The simplest way of thermo-mechanical recycling is re-melting the sorted polyester waste. This method is applied for example in bottle-to-bottle technologies, where sorted PET-bottles are re-melted in crushed shape and reprocessed to bottles as beverage packaging. Several studies have been conducted on thermal re-processing PET. During this process, the polymer is exposed to high temperatures, shear forces and pressures. Thus, thermal degradation of PET occurs. As a consequence, reduced thermal and mechanical properties of the re-processed material typically occur. Hence, a repeated thermal re-processing of polyester waste leads to a downcycling of the material. The problem of unwanted coloration of the recycled polyester material is typically overcome by using additives. Since the collection of polyester waste entails generally a mixture of differently coloured polyester materials, such thermally re-processed material leads to undesired coloration of recycled polyester. Therefore, the addition of complementary colours to polyester waste has been applied to mask discoloration. Although being an approved procedure, this method severely limits the use of the recycled polyester, in particular as a food packaging material.

A fourth class of processes to recycle polyester waste are the so-called chemical recycling (chemolysis) processes, wherein recycling of polyester waste material is enabled by depolymerisation into monomers and/or oligomers. This class can be divided in numerous sub-classes depending on the type of reactant used for the chemolysis.

An example is the application of ionic liquids for de-polymerization, first described around the year 2000. This method was developed to avoid the drawbacks of other methods like alcoholysis (high pressure and temperature as well as a heterogeneous reaction product) or acidic and alkaline hydrolysis (pollution problems) to provide an eco-friendly degrading agent for polymers and to enable degradation under moderate reaction conditions. However, no application of the obtained reaction products has hitherto been described.

As an alternative castor oil is applied for de-polymerisation. This method was developed to provide a renewable substitute of petrochemical agents (for example, glycols) for PET de-polymerization. After de-polymerization, the reaction products were aimed for the preparation of polyurethane systems. However, it appears to be very difficult to determine characteristic molecular weights due to the excessive amount of applied castor oil. Also, even with precise control of the reaction temperature a heterogeneous mixture of reaction products is obtained.

The degradation of polyester polymers using enzymes was first described in the 1970's. As the use of ionic liquids and castor oil, this bio-chemical method was developed to provide an eco-friendly procedure of polymer recycling in contrast to conventional chemical recycling methods. However, efficiency is rather low with respect to complete de-polymerization of the polyester and hence quantitative recovery of homogeneous reaction products for re-use is not possible.

Alcoholysis for de-polymerization of PET was first described in the early 1990's. This method was developed to avoid the drawbacks of the acidic and alkaline hydrolysis (pollution problems) to provide a renewable and more eco-friendly degrading agent for polymers. Generally, polyester is de-polymerised with an excess of an alcohol to yield corresponding esters of the corresponding acid and ethylene glycol. Among the alcoholysis methods, reaction with methanol has gained special importance because of the low price and the availability of methanol. Also ethylene glycol (a diol, the use of which is sometimes classed separately as "glycolysis", although it falls in the class of alcoholysis) is used mainly in reactive extrusion to produce low molecular weight oligomers. However, these oligomers have to be separated and purified for further processing, since the crude reaction product consists of a heterogeneous mixture of monomer, oligomers and polymers. Various other alcohols are described to be useful such as pentaerythritol, 1-butanol, 1-pentanol and 1-hexanol and 2-ethyl-1-hexanol. Also other diols than ethylene glycol, like BHET, neopentyl glycol (NPG), tetraethylene glycol (TEEG), polyethyleneglycol, polytetramethylene oxide and terpoly[poly(oxyethylene)-poly-(oxypropylene)-poly(oxyethylene) are described in the art for depolymerizing polyester by alcoholysis. However, in all cases mixtures of undefined low molecular weight oligomers are typically obtained. Another serious downside of alcoholysis is the need for a catalyst. The most important catalysts have been zinc acetate and manganese. Further catalysts are cobalt and lead acetate. The need of such catalysts hamper the wide application of alcoholysis for recycling polyester waste material.

Aminolysis and ammonolyis were developed for polyester recycling, since the reactivity of the amine-group is higher than the hydroxyl-group or alcohols used alcoholysis of polyester. However, as for alcoholysis, the need for a metal catalyst remains.

Lastly, an alternative chemical recycling of polyester is given by the controlled de-polymerization of polyester using blocking chain scission with defined amounts of the de-polymerization agent (see Geyer et al. in eXPRESS Polymer Letters Vol. 10, No. 7 (2016) 559-586). This method produces polyester oligomers of well-defined molecular weights in a greater range than existing chemical methods like alcoholysis. However, this method requires sorted polyester material, which has to be free of contaminants.

While energetic and thermo-mechanical recycling entail downcycling of the material, chemical recycling requires considerable amounts of chemicals, and chemical recycling has as a main disadvantage its high costs, the variability of the end product (which largely depends on the type of waste material), the need for using a (metal) catalyst and the difficulty of removing colourants. Therefore, a need exists for improved methods, systems and process to enable the recycling of polyester waste materials.

OBJECT OF THE INVENTION

It is an object of the present invention to devise a process and system that enable the recycling of polyester waste materials, independent of the molecular weight of the polyester in the waste material (and hence the intrinsic viscosity which typically varies between 0.65 dl/g for textile and tray materials, 0.80 dl/g for bottle grade products, 0.95 dl/g for strapping, and 1.0 dl/g and above for high tenacity yarn), and independent of the amount of contaminants such as colourants, pigments and other particulate matter, by depolymerizing the polyester to a predetermined oligomer length without the need of adding a catalyst, and at the same time be able to purify it such that it is suitable for repolymerization to a high grade polyester of any required molecular weight.

SUMMARY OF THE INVENTION

In order to meet the object of the invention a process was developed to enable the recycling of a stream of polyester waste material by depolymerising the polyester by alcoholysis, the process comprising at least a first stage of depolymerisation and a separate second consecutive stage of depolymerisation, to which first and second stages the stream of polymer waste material is subjected in a continuous manner, wherein in the first stage of the two consecutive stages, the stream of polyester waste material is continuously fed to an extruder operated at a temperature above the melting temperature of the polyester, while a first amount of alcohol is co-fed to the extruder, in order to produce a fluid mixture comprising a melt of the at least partly depolymerised polyester, and wherein in the second stage, the said fluid mixture is continuously fed to a continuously stirred tank reactor (CSTR) operated at a temperature above the melting temperature of the polyester, while co-feeding a second amount of alcohol to the CSTR (which alcohol is not necessarily the same as the alcohol fed in the extruder), wherein a residence time in the CSTR is used to provide at the outlet of the CSTR a continuous stream of polyester depolymerised into an oligomeric ester.

It was found that this way the depolymerisation of polyester, such as for example PET, can be controlled accurately in a continuous and thus energy saving process, independent of the IV of the starting (waste) material, such that the polyester is broken down to a oligomeric ester of a predetermined oligomer length, even with a very low polydispersity (typically around 2), without the need of adding a catalyst, while at the same time an intermediate viscosity in between the stages, or after the CSTR is low enough to remove any particulate matter such as pigments and fillers by simple methods such as filtration. This provides the option to use the depolymerised material to obtain high grade polyester of any required molecular weight. So even without the need of add any catalyst, in a process that requires a low amount of energy, any polyester waste material can ultimately be upcycled to a high-grade polyester.

The invention is based on a combination of features that together provide the advantageous effect as described. Importantly the two-stage feature, both operating at a temperature at which an alcohol is able to depolymerise the polyester, provide the option that in the first stage the amount of depolymerization can be adjusted to the molecular weight (and thus IV) of the starting material. This way, the input for the second stage is less variable leading to an easier control of the outputted oligomeric ester. Next to the above, it is essential that the first stage comprises an extruder, such that it can be ensured that the starting material, to a great deal independent from its starting constitution, can be thoroughly mixed to become a dense homogenous melt which allows adequate control of the depolymerisation. Applicant recognised that the residence time in a CSTR can be used to allow arrival at a low polydispersity level by inherent transesterification. By controlling the input of the CSTR by proper dosing of the alcohol in the extruder, also the output of the CSTR can be adequately controlled based on temperature and residence time. Another important feature is the use of alcoholysis in both stages. Although in the art hydrolysis is most commonly used, it was found that this leads to an oligomeric product that is less easy to re-polymerise again. Hydrolysis inherently introduces free carboxyl groups, which appears to negatively interfere with repolymerisation of the oligomeric material, at least when compared to an oligomeric product that is the result of depolymerisation by using an alcohol. Surprisingly, the process can be operated without adding a catalyst. Without being bound to theory, this may be partly due to fact that polyester waste material contains traces of metal (catalyst) and the fact that the process is run continuously, such that the waste material is continuously kept at elevated temperature until broken down sufficiently. Another important aspect is that applicant has recognised that the depolymerisation need not necessarily be down to monomers. Although monomers provide the advantage of being a clean, well defined starting material and thus generally recognised as being ideal for repolymerisation, it was applicant's recognition that the same applies for a well-defined oligomer, given the fact that polymerisation has to take place anyhow. The problem hitherto encountered has always been the heterogeneous nature of any oligomeric product that results from the depolymerisation of (various) polymer waste material, and hence the wish to depolymerise to monomers. However, that problem can be overcome using the process of the invention. Thus, applicant recognised that it is sufficient to depolymerise the polyester to an oligomeric ester, as long as its composition is able to be controlled, while at the same time ensuring that the viscosity in between the two stages or after the CSTR is low enough to be able and apply a simple technology like filtering to remove any particulate contaminants such as pigments and fillers, or any non-polyester polymer that has not broken down in the process. By controlling the level of depolymerisation at the various stages, and thus, the obtained viscosity, it is possible in the continuous process of the present invention to apply in line filters to remove any non-polyester material, at hardly any additional energetic costs.

It was found that the invention is effective for different types of polyesters. Also, the amount and type of alcohol is not essential to the depolymerisation process as such, as is commonly known. Depending on the type of polyester, type and amount of alcohol, one may arrive at different levels of polymerisation (when the other circumstances, such as residence time, are the same), or vary the circumstances to arrive at a predetermined level of depolymerisation. This can be controlled by measuring the viscosity of the (partly depolymerised) polyester mixture. For any type of polyester at its various stages of depolymerisation by a particular alcohol, a reference curve can be made beforehand that defines the relationship between viscosity and depolymerisation.

It is noted that in the art processes are known that partly use features of the present invention. For example, CZ 299244 (assigned to Sirek Milan) discloses a process of basic hydrolysis of waste PET based on the principle of two-stage chemolytic decomposition to terephthalic acid salt and ethylene glycol, wherein in the first stage of the process the PET waste is degraded by simultaneously running extrusion hydrolysis and glycolysis, and wherein in the second stage a melt of the resulting oligomeric products of the PET reactive extrusion leaving the first stage, is subjected in a continuous sequence and under continuous dosing of aqueous solution of alkali metal hydroxide and/or ammonium hydroxide to basic hydrolysis in the presence of a catalyst.

U.S. Pat. No. 4,620,032 (assigned to Celanese Corporation) also discloses a two-stage process, but the process is based on hydrolysis. In particular, in the known process the polyester is intimately mixed with a depolymerizing agent which is either one of the products resulting from the complete hydrolytic depolymerization of the condensation polymer or water. The depolymerization agent is mixed with the polyester for a time sufficient that the molecular weight of the polyester in a first stage is reduced by at least 50%. The treated condensation polymer of lower molecular weight is thereafter subjected in a second stage to neutral hydrolysis to effect complete hydrolytic depolymerization to a monomeric material, which material that can be used for repolymerization.

WO9720886 (assigned to Eastman Chemical Company) discloses a one stage batch process wherein postconsumer or scrap polyester is reacted with glycol to produce a monomer or low molecular weight oligomer by depolymerization of the polyester. The monomer or oligomer, as the case may be, is then purified using one or more of a number of steps including filtration, crystallization, and optionally adsorbent treatment or evaporation.

The present invention also pertains to a system for recycling of a stream of polyester waste material by depolymerising the polyester by alcoholysis, the system comprising an in line arrangement of three consecutive reactors for conducting a continuous process inducing alcoholysis of the polyester, the first reactor being a twin screw extruder having a feeding entrance for feeding an alcohol in the distal 20% of the twin screw extruder length, the second reactor being a single screw extruder having a feeding entrance for feeding an alcohol in the middle 30-70% of the single screw extruder length, and the third reactor being a continuous stirred tank reactor having a feeding entrance for feeding an alcohol.

DEFINITIONS

A polyester is a polymer in which the monomer units are linked together by an ester group. They are typically formed by polymerizing a polyhydric alcohol with a polybasic acid, and used mainly in the manufacture of resins, plastics, and textile fibres. It is well known that polyesters may be prepared by a condensation polymerisation process in which monomers providing the "acid component" (including ester-forming derivatives thereof) are reacted with monomers providing a "hydroxyl component". If desired the polyesters may also comprise other linking groups such as for example a proportion of carbonylamino linking groups —C(=O)—NH— (i.e. amide linking group) or —C(=O)—N—$R^2$— (tertiary amide linking group). Polyester as used in everyday life can be aliphatic, semi-aromatic or aromatic. Typical examples are polyglycolic acid (PGA), polylactic acid (PLA), polycaprolactone (PCL), polyhydroxyalkanoate (PHA), polyhydroxybutyrate (PHB), polyethylene adipate (PEA), polybutylene succinate (PBS), poly(3-hydroxybutyrate-co-3-hydroxyvalerate) (PHBV), polyethylene terephthalate (PET), polybutylene terephthalate (PBT), polytrimethylene terephthalate (PTT), polyethylene naphthalate (PEN) and Vectran, a polycondensation product of 4-hydroxybenzoic acid and 6-hydroxynaphthalene-2-carboxylic acid. Of these PET, also abbreviated as PETE, or the obsolete PETP or PET-P, is the most common thermoplastic polymer resin of the polyester family and the virgin material is considered as one of the most important engineering polymers of the past decades. It is regarded an excellent material for many applications and is used in fibres for clothing, containers for liquids and foods, thermoforming for manufacturing, and in combination with glass fibre for engineering resins. It is also referred to by brand names such as Terylene, Arnite, Eastapac, Mylar, Lavsan, Dacron etc. A polyester may contain up to 50% (w/w) of non-polyester polymer chains (e.g. 0, 1, 2, 3, 4, 5, 6, 7, 8, 9, 10, 15, 20, 25, 30, 35, 40, 45, 50%) while still being referred to as a polyester material.

The melting temperature of a polyester is the temperature above which the polyester has the properties of a liquid. Since many polymers typically do not have a very sharp melting point, the melting temperature may be the highest temperature of a fairly broad temperature range in which the polymer slowly becomes "leathery," then "tacky," and then finally liquid.

A polyester waste material is a post-consumer material at or after the end of its consumer life-time, i.e. the time during which it is used by a consumer for practical or esthetical purposes, which in essence is composed of polyester and up to 10% (e.g. 0, 1, 2, 3, 4, 5, 6, 7, 8, 9, 10) of additives like fillers (e.g. fibrous like material or particulate matter), stabilisers, colorants etc.

Depolymerising means to lower molecular weight, by breaking down the original polyester molecules to shorter length molecules down to for example oligomers.

A continuous process is a flow production process used to process materials without interruption. In such a process the materials, for example dry bulk or fluids are continuously in motion, undergoing chemical reactions and/or subject to mechanical or heat treatment. A continuous process is contrasted with a batch process.

Alcohol is a hydrocarbon substance or mixture of such substances formed when a hydroxyl group is substituted for a hydrogen atom in the hydrocarbon. The alcohol can be monovalent, divalent (i.e. a diol), etc.

Mixing means to combine or blend into one mass. Mixing two compounds does not exclude that the compounds react while being mixed to form other compounds in the mixture.

Intrinsic viscosity is a measure of a solute's contribution to the viscosity q of a solution, see "Progress in Biophysics and Molecular Biology" (Harding 1997). The IV can be measured according to DIN/ISO 1628. Typically, a concentration of 1% for the polymer is used and m-cresol as solvent, wherein the IV can be expressed in dl/g (often presented without the latter dimension). A practical method for the determination of intrinsic viscosity is by using an Ubbelohde viscometer.

Two consecutive stages means that the respective first and second stage follow in a continuous manner, thus without interruption. This however does not exclude that one or more additional intermediate process steps takes place in between the two stages.

FURTHER EMBODIMENTS OF THE INVENTION

In a further embodiment of the process according to the invention the total amount of alcohol of the first and second amount of alcohol (thus both amounts added up), is between 3 and 12% w/w with respect to the stream of polyester material. It was found that below 3% the depolymerisation may be to such a (low) degree that a viscosity may not be obtained that allows easy purification (e.g. by filtering) of the oligomeric material. Above 12% there is a risk that a substantial amount of alcohol may not react which is disadvantageous for a repolymerisation process. Also, at such a high amount the depolymerisation may lead to a substantial amount of monomer or low level oligomers which is simply not needed, costing extra effort in the breakdown as well as in the repolymerisation. Preferably, the first amount of alcohol is between 1 and 5% w/w with respect to the stream of polyester material, and the second amount of alcohol is between 2 and 8% w/w with respect to the stream of polyester material. It was found that in the extruder a lower amount of alcohol is advantageously applied since this way the goal of first stage controlled depolymerisation to a predetermined viscosity level can be obtained while avoiding loss of alcohol due to evaporation in the extruder. The higher amount of alcohol in the second stage can be used to fine tune the depolymerisation. In the CSTR the upper limit of alcohol is less critical than in an extruder. A preferred total amount of alcohol used to depolymerise the polyester is believed to be between 5 and 8% w/w with respect to the stream of polyester waste material.

In another embodiment, the first stage comprises first and second separate consecutive sub-stages, wherein each of the first and second substages comprises a corresponding extruder, each operated at a temperature above the melting temperature of the polyester, while co-feeding an amount of alcohol to each extruder, to produce the fluid mixture fed to the CSTR. It was found that it is advantageous to use two separate extruders (placed in line). Since the residence time in an extruder is relatively short, and thus, the length for mixing a volatile agent is limited, let alone a substantial amount of such an agent, it appeared to advantageous to use two separate consecutive extruders. An additional advantage is that the functionality and thus the operation of each of the extruders can be better tuned towards the (sub-)stage of depolymerisation. The first extruder being operated to be able and optimally convert the polymer waste material into a dense melt, whereas the second extruder being operated to be able and optimally control the depolymerisation towards a constant IV level, independent of the IV of the starting material. Preferably, the alcohol fed to the extruder of the first sub-stage, is fed in the distal 20% of the extruder length (i.e. the last 20% of extruder length viewed in the process direction), preferably in the distal 5-15% of the extruder length, preferably at around 10% (i.e. between 9 and 11%) of the extruder length. This minimizes the risk of loss of alcohol due to evaporation and ensures at least a partial initial depolymerisation such that the second extruder is easier to be controlled. For this, the alcohol fed to the extruder of the second sub-stage, is advantageously fed in the middle 30-70% of the extruder length, preferably in the middle 40-60% of the extruder length, preferably at around 50% of the extruder length (i.e. between 49 and 51%). This way, the provision of a melt of the polymer waste material to a predetermined IV can be easily obtained.

Advantageously, the amount of alcohol fed in the extruder of the first sub-stage is between 0 and 2% w/w (i.e. an amount above zero up to 2%) with respect to the stream of polyester material and the amount of alcohol fed in the extruder of the second sub-stage is between 1 and 5% w/w with respect to the stream of polyester material. This ratio appears to be very suitable in the process of the invention.

In a further embodiment the extruder of the first sub-stage is a twin-screw extruder. Since some polyesters, especially PET, are sensitive to shear, it is advantageous to try and lower the amount of shear by using a twin-screw extruder. Further advantageously, the extruder of the first sub-stage is a conical twin-screw extruder. A conical shape is better able to take up the great variability of polyester waste material which in many cases is fluffy, or at least has a low density.

In another embodiment the extruder of the second sub-stage is a single screw extruder. A single screw extruder is better able to obtain a high pressure which is advantageous to mix in a higher amount of volatile reagent. The fact that a dense melt is already produced by the first extruder minimizes the requirements for being able to take up materials with varying density.

In yet another embodiment the two consecutive stages are preceded by a step wherein the stream of polyester waste material is subjected to a drying process to reduce the amount of water in the stream to less than 5000 ppm, i.e. less than 0.5% w/w of water with respect to the stream of polyester waste material. The presence of water in the process inevitably leads to free carboxyl groups due to hydrolysis. A high level of free carboxyl groups, i.e. above 45 mmol/kg at the end of the initial repolymerisation process (i.e. the process wherein the oligomeric ester is repolymerised into an—amorphous—polyester, typically having an IV of between 0.4 and 0.6), is disadvantageous in the present process that aims at an oligomeric polyester that is easy to repolymerise in a further solid state repolymerisation process. The type of pre-drying process is not essential. Pre-drying can be done in different ways, e.g. by simply blowing hot air at 120° C. through a bed of polyester flakes or agglomerates, which may already suffice to reduce the moisture content below 5000 ppm. However, since this still may require quite a low vacuum in the extruder to remove any additional moist if desired, it is preferred to use more vigorous methods like a desiccant air dryer with hot air at 150° C., or a dryer applying a (low) vacuum. Advantageously, the amount of water in the stream lies between 10 and 1000 ppm, preferably between 20 and 100 ppm, most preferably around 50 ppm. Surprisingly, it was found that for a convenient solid state repolymerisation process a very low level of free carboxyl groups, i.e. a level below 10 mmol/kg, also leads to a decrease of polymerisation rate. Hence, it was established that there is a preferred range of the moist level, i.e. between 10 and 1000 ppm for the waste stream that enters the first extruder. Fifty ppm is believed to be an optimal level.

In yet a further embodiment of the process according to the invention the amount of alcohol fed in the first stage of the process is controlled by measuring a viscosity of the fluid mixture fed to the CSTR and adjusting the amount of alcohol to arrive a predetermined value for the said viscosity, which predetermined value is preferably an intrinsic viscosity (IV) between 0.1 and 0.2 dl/g. In this embodiment a so-called loop-control is introduced in the process to ensure that the material fed to the CSTR has a predetermined viscosity (depolymerisation) level, at least within a reasonably controllable range. This supports the production of a predetermined oligomeric ester within a narrow viscosity/oligomeric range in the CSTR. In case the fluid mixture has a viscosity level that is too high (and thus, the depolymerisation rate is too low), more alcohol is fed in the first stage to increase the depolymerisation rate. The other way around, when the viscosity level is too low, the amount of alcohol fed in the first stage can be reduced.

The same way, a loop control is advantageously introduced for feeding the amount of alcohol to the CSTR. For a viscosity of the stream of oligomeric ester leaving the CSTR is measured and the amount of alcohol fed to the CSTR is adjusted to arrive at predetermined value for the viscosity, which predetermined value is preferably an intrinsic viscosity (IV) between 0.08 and 0.11, more preferably between 0.09 and 0.1.

In still another embodiment the fluid mixture fed to the CSTR is pumped through a first filter arranged between the first stage and the second stage, the filter preferably having a mesh size between 10 and 80 μm, preferably between 30 and 50 μm, most preferably around 40 μm. Such a filter can be advantageously used to remove any particulate matter or non-polyester polymer (not broken down by the alcoholysis process) but at the same time functions as a means to homogenise the fluid mixture. The option of such a filter is made possibly since in the present method the local viscosity can be monitored and controlled. When the first stage comprises two separate consecutive extruders, a second filter is arranged between the first sub-stage and the second sub-stage of the first stage, the second filter (being upstream of the above mentioned first filter) preferably has a mesh size between 40 and 120 μm, preferably between 60 and 100 μm, most preferably around 80 μm, to remove typical contaminating particulate matter. The second filter also functions as a homogeniser. If deemed necessary, for example when desiring to introduce over 1% of alcohol before entering the second extruder, a static mixer can be place right before or after the second filter.

Likewise, the stream of oligomeric ester is pumped through a third filter arranged after the CSTR, the third filter preferably having a mesh size below 20 μm, more preferably between 5 and 10 μm. This is to remove any remaining fine particulate matter such as pigments, or any remaining non oligomeric polymer material. Also, this way active carbon that may be added to the CSTR in order to bind any colourants, can be removed by filtration. Active carbon is ideally suitable for removing colourants given the relatively long residence time in the CSTR (when compared to the extruder(s)).

The alcohol preferably comprises a diol such that the oligomeric ester is a hydroxylated oligomeric ester, preferably at least a diol selected from the group of ethylene glycol, 1,3-propanediol, (1,4-)butanediol, cyclohexane dimethanol and neopentyl glycol. The use of a diol leads to an easy to repolymerise oligomer.

In particular, if the polyester is polyethylene terephthalate (PET), the residence time in the CSTR is chosen (controlled) such that the oligomeric ester for over 50% w/w, preferably over 60, 70, 80 or even 90% w/w, comprises oligomers of 4 to 16 Bis(2-Hydroxyethyl) terephthalate (BHET) units, preferably 6 to 14 (BHET) units, most preferably, 8 to 10 BH ET units. This material is very well defined, has a viscosity low enough to allow filtration through very fine filters, and is easy to repolymerise by applying a simple vacuum at elevated temperature.

For an initial repolymerisation step, the continuous stream of oligomeric ester is heated (either as a further step in the continuous process or batchwise) to an elevated temperature above the melting temperature of the polyester (typically above 240, or even above 250° C.) while subjected to a vacuum below 10 mbar, preferably below 5 mbar, preferably between 0.5 and 2 mbar, most preferably around 1 mbar, to induce repolymerisation by removing the alcohol (which shifts the equilibrium towards the polymer), to arrive at a repolymerised amorphous polyester, preferably having an IV between 0.4 to 0.6. Additional advantage of the high vacuum is that any volatile contaminants which might be present (such as benzene and Bisphenol A) are removed at the same time. It may be that in order to be able and arrive at the low pressure of around 1 mbar, a combination of two condensation reactors is needed (depending mainly on the amount of volatile material present in the oligomeric material). In any case, the resulting material is stable, highly pure, well defined, and thus can be easily upgraded to a high-grade polyester of any IV. For this, the repolymerised polyester can be heated to an elevated temperature below the melting temperature of the polyester (i.e. below 250° C., or even below 240, 230 or, 220° C., typically around 210° C.) while subjected to a vacuum (i.e. a pressure below 0.5 bar, preferably below 0.1 bar, or even below 50 mbar, 40 mbar, 30 mbar, 20 mbar or 10 mbar) or an inert gas, to induce additional repolymerisation, preferably to arrive at an IV above 0.6. Preferably, the additional repolymerisation step is preceded by a solid-state crystallisation step by cooling down the repolymerised amorphous polyester to a temperature between 130 and 180° C. to arrive at a solid amorphous polyester, and keeping the solid amorphous polyester at that temperature until the polyester has at least partly crystallised.

The above does not exclude any variants from the process or additional process steps. For example, additional purification/filtration steps can be added. Also, the invention is not restricted to particular types of filters, although screen changer type filters are believed to be ideally suitable for a continuous process as claimed since depending on the amount of particulate matter present in the polyester waste material, filters may need to be changed every few hours. Also, when applying a filter, this may very well be a cascade of two, three or more separate consecutive filters of descending mesh size in order to withstand pressure differences over the filters. Next to this, in order to be able and fully remove all colourants and dies, the melted material may advantageously be pumped through a bed filled with (activated) carbon granules, $SiO_2$ granules, or any other small molecule absorbing material.

It is also foreseen to introduce copolymerization in one or more of the repolymerization steps, typically the initial repolymerization step. For example, a slurry of a pure diacid and a pure diol can be prepared, and/or other monomer can be formed which can be added to the initial polycondensation reactor to which the purified ester oligomers as obtained with the process of the present invention are added. When the diacid and/or diol differs from the monomers as present in the polyester waste material, a copolymer is being produced. Such monomers could for example be bio-based, to further reduce the $CO_2$ footprint or could be e.g. isophthalic acid, succinic acid, neo pentyl glycol, to obtain other product characteristics of the ultimate polyester to be produced, adapted to the intended application.

Any of the above further embodiments can also embodied in the system of the invention.

The invention will now be further illustrated using the following non-limiting figures and examples.

DETAILED DESCRIPTION

Example 1 provides various experiments in a single screw extruder alone.

Figure 1:
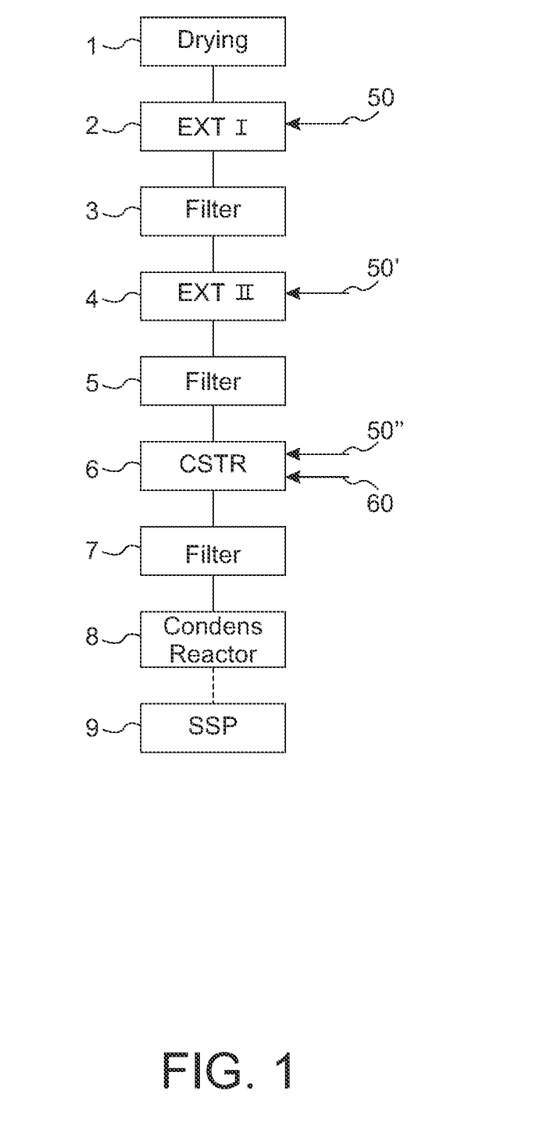
FIG. 1 schematically depicts an overview of a process according to the invention.

Example 2 provides various experiments, including a two stage depolymerisation process according to the invention.
FIG. 1

FIG. 1 schematically depicts an overview of a process according to the invention. In the shown process, PET is depolymerised and repolymerised in a continuous process through steps 1-8. Step 9 is an additional repolymerisation step including solid-state polymerisation, to arrive at a required IV above 0.6.

The process is based on the commonly known equilibrium reaction of PET in an alcoholysis based on mono ethylene glycol (MEG):

BHET ↔ [PET]x+½×MEG

By adding MEG to the polyester melt, the equilibrium shift to the left, resulting in shorter polymer chains, ultimately oligomers (less than 100 repeating BHET units, in particular less than 50, 40, 30, 20 or even 10 units) and decreasing viscosity. By removing MEG, for example by using a vacuum or nitrogen, the short chains react with each other to form a polyester again. By controlling the depolymerisation rate, and thus the oligomer length, the viscosity of the material is controlled.

In step 1, a polyester waste material comprising pieces of (pure) PET carpet and flakes of PET bottles is dried to a moisture level of 50 ppm. Then, in step 2 the dried stream of waste material is fed to a conical co-rotating twin screw extruder. Due to the conical shape of the extruder the opening for feeding the material is bigger than with a conventional twin-screw extruder so feeding is easier and it generates less shear due to a more gentle natural compression giving less thermal damage to the polymer. Thermal degradation generates undesirable side reactions and formation of end groups giving an inferior end-product quality. The extruder is operated at 280° C. to melt the polyester completely. Adjacent the end of the conical twin screw extruder (at 10% of its length) an injection point for dosing MEG (indicated as arrow 50) is provided to obtain the first step in depolymerization, thus reducing the viscosity. For this, about 1% of MEG (w/w) is dosed. The reduction of the IV also helps to minimize the pressure difference over the first filtration step 3 to make it possible to filtrate with a mesh size of 80 micrometre. The filter also acts as a static mixer to homogenize the mixture and distribute the added glycol with the molten polymer to react completely with shorter polymer chains and a molecular weight distribution at equilibrium (dispersion grade of about 2) as a result. Process parameters are chosen such that the MEG is (almost) fully reacted and no (hardly any) free MEG is present anymore.

Figure 2:
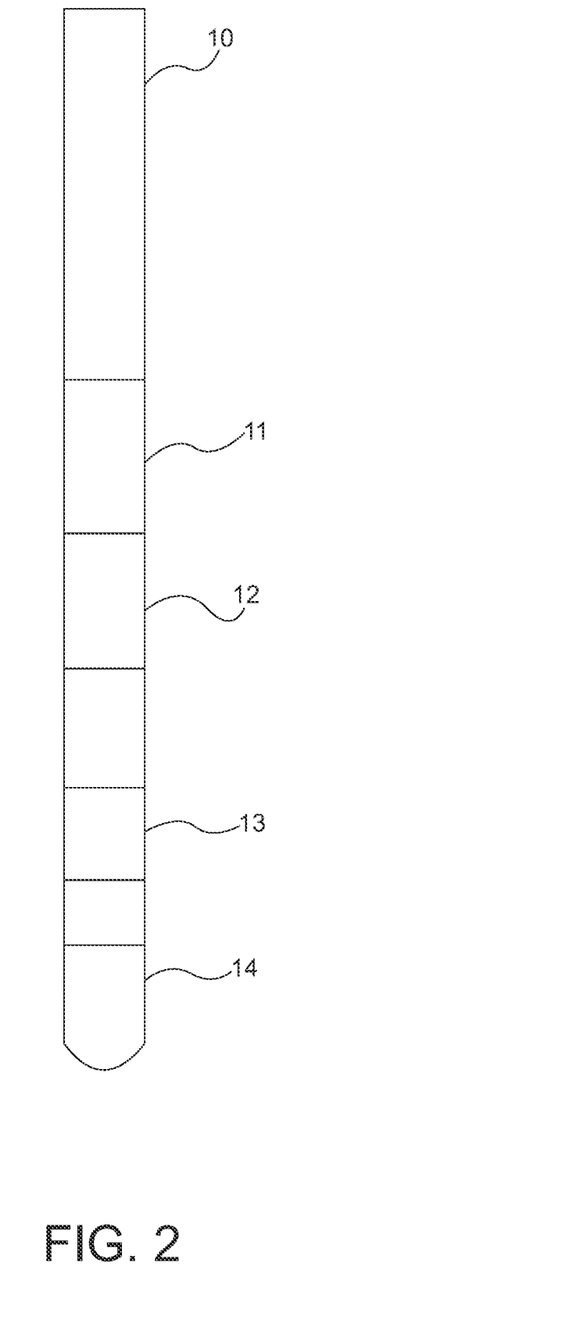
FIG. 2 schematically depicts a screw for use in a single screw reactive extrusion process.

The partly depolymerized and filtered material is fed to a single screw extruder in step 4. The screw design is schematically depicted in FIG. 2. This design aims at maximising the percentage glycol which can be dosed (preventing the melt from becoming inhomogeneous). This maximum is increased by adjusting common process parameters like screw speed, pressure build up, etc. Typically, about 3-4% of MEG is dosed in this extruder (indicated by arrow 50'). At the end of the extruder the viscosity of the melt is measured. The level of the viscosity is controlled by an automated control loop (not indicated in FIG. 1) controlling the level of MEG being dosed in the single screw extruder. This automated control loop results in a consistent viscosity, typically an IV between 0.1 and 0.2, independent of the IV of the starting material. Due to the inherent transesterification reaction which takes place in the extruder, the polydispersity may remain low, preferably around 2-3, depending mainly on the residence time in the extruder (which may be adjusted in the process by controlling initial feed and extruder speed).

The depolymerized material is filtered for a second time in step 5. Due to the IV of about 0.15 the filtration size can be reduced in comparison to the first filter, preferable being 40 micrometre, without a pressure difference over the filter being too high.

The material with an IV of about 0.15 (0.1-0.2) is continuously added to the CSTR in step 6. In this CSTR also MEG is added (indicated by arrow 50") to further depolymerize the material to the required viscosity/oligomer length. Due to the fact that the material already has a low (controlled) viscosity upon entry, the difference in viscosity with the added MEG is not so big that homogeneous mixing is critical. 4-6% of MEG can be homogeneously mixed easily. The residence time in the CSTR is long enough (typically 25-45 minutes) to depolymerize the material to the required oligomer length, but also to have enough time for the transesterification reaction to obtain a polydispersity of 2. At the end of the reactor the viscosity is measured and with an automated control loop controlling the addition of MEG in the reactor. This results in an extremely stable continuous process hardly dependent on the type (IV) of the starting material.

In the CSTR, decolouration takes place by adding activated carbon, indicated by arrow 60. The activated carbon may be pre-selected for the best performance to absorb the colourants present in the polyester waste. After the CSTR, the low viscous oligomer/activated carbon mixture is pumped through a three-step micro filtration (20/10/5 micrometre) step 7 to remove the carbon particles loaded with colourant from the oligomers. A parallel set of three filters is installed so that in case of a pressure difference over the filter that is too high, the melt can be pumped through the parallel set, while the first filter set can be cleaned.

After the filtration while the melt is still an elevated temperature of about 250° C., the melt is pumped to the polycondensation reactor (step 8) which is operated under vacuum at 1 mbar, at a temperature of about 260° C., to remove the MEG, with the result that the equilibrium of the BHET/PET equilibrium shifts to the right forming the PET polymer. In this reactor also a significant purification step takes place since any volatiles with a boiling point up to 250-260° C. (e.g. benzene and Bisphenol A) are removed from the material. Due to the processing conditions, a polyester with an IV between 0.4 and 0.6 can be obtained. The polymer is removed from the reactor and pumped through a die-plate provided with holes, thus generating polymer strands. These strands are cooled down and cut into amorphous granules.

The amorphous granules undergo an off-line crystallisation process by subjecting the granules to a temperature of 130-180° C. which leads to a crystallisation process. The partly crystallised granules are subjected to a solid-state polymerisation process wherein the polyester is heated to an elevated temperature below the melting temperature of this polyester while subjected to a vacuum or an inert gas. This way a solid state additional repolymerisation is induced, to arrive at an IV above 0.6. The obtained IV can be adjusted by processing parameters in a way that the IV matches the required IV for the intended application, having any value between 0.65 and 1.0 typically.

FIG. 2

FIG. 2 schematically depicts a screw 10 for use in a single screw reactive extrusion process. The basic design of the screw is standard, but the screw has four non-standard zones designed for optimizing the polyester/oligomer and volatile reactant. At the middle section of the screw, where the alcohol reactant is dosed, the screw is provided with a double screw design, indicated as 11. In downstream direction, this zone is followed by a zone 12 in which the screw also is provided with a double screw design, but at which zone the screw is partially milled through (as such a known set-up for improved mixing). In further downstream direction there is an energy transfer mixing zone 13. The distal zone 14 lastly is of a so-called Saxton type.

Example 1

Example 1 provides various experiments in a single screw extruder alone.

Depolymerization of PET to oligomers with monoethylene glycol (MEG) by reactive extrusion has been performed in a range of 10-20 kg/h. It was found that up to 3% MEG could be properly dosed in a single screw extruder with a standard screw design (not optimsed for dosing MEG). Control of the moisture content of the PET flakes was achieved by pre-drying and applying degassing by vacuum to the extruder. This limited the hydrolysis of PET during the melting process, with the carboxyl end groups increasing by 7 mmol/kg.

The results are listed in Table 1. The amount of MEG used in the extruder for depolymerization depends i.a. on the capacity of the extruder and its screw design. This has to do with the residence time in the extruder and the effectiveness of mixing MEG with PET. This effect can also be seen if the PET is too moist. The increase in hydrolytic depolymerization means that the amount of MEG that can be added decreases. This phenomenon is caused by too low pressure in the extruder which causes the vapor pressure of MEG and the low viscosity of the oligomer to push it out of the extruder and cause an unstable depolymerization process. Increasing the pressure in the extruder will contribute positively to the stability of the depolymerization process and the amount of MEG that can be added while still arriving at a homogenous mixture.

TABLE 1

Influence of PET dosing

| % MEG | 10 kg PET/h IV | 15 kg PET/h IV | 20 kg PET/h IV |
| --- | --- | --- | --- |
| 0.0 | 0.76 | 0.76 | 0.76 |
| 0.7 | n.d. | 0.276 | n.d. |
| 1.1 | n.d. | 0.233 | n.d. |
| 1.2 | 0.209 | n.d. | n.d. |
| 1.3 | n.d. | n.d. | 0.234 |
| 1.4 | n.d. | 0.207 | 0.198 |
| 1.7 | n.d. | n.d. | 0.174 |
| 1.8 | 0.173 | n.d. | n.d. |
| 2.0 | 0.176 | 0.175 | n.d. |
| 2.2 | 0.157 | n.d. | 0.165 |
| 2.4 | 0.161 | n.d. | n.d. |
| 2.5 | 0.157 | n.d. | n.d. |
| 2.6 | 0.153 | n.d. | n.d. |
| 2.7 | n.d. | 0.153 | n.d. |
| 2.8 | 0.145 | n.d. | n.d. |
| 3.0 | 0.124 | n.d. | n.d. |

The speed of the extruder screw contributes to the mixing of MEG with PET. Table 2 shows this at 10 and 15 kg/h. At a higher capacity (20 kg/h) and the same percentage of MEG, an opposite effect is seen. It is believed that a higher screw speed, leading to more transport, results in a residence time in the extruder that is too short for a complete depolymerisation. The mixing effect of the screw is seen in particular at speed below <70 rpm (results not shown). Then, depolymerization becomes unstable and MEG is released from the extruder as vapor.

TABLE 2

Influence of screw speed

| PET kg/h | MEG kg/h | IV | Extruder rpm |
| --- | --- | --- | --- |
| 10 | 0.20 | 0.166 | 70 |
| 10 | 0.20 | 0.161 | 135 |
| 15 | 0.30 | 0.166 | 113 |
| 15 | 0.30 | 0.164 | 163 |
| 20 | 0.35 | 0.177 | 139 |
| 20 | 0.35 | 0.181 | 169 |
| 20 | 0.40 | 0.169 | 139 |
| 20 | 0.40 | 0.184 | 189 |

As long as a good mixing of MEG with PET takes place and sufficient reaction time is given, almost all MEG will react with the polyester. Table 3 shows measurements performed on oligomer collected in water. Virtually no MEG is present in the water phase.

TABLE 3

Free MEG in product

| PET kg/h | MEG kg/h | Polymer sample | Water | MEG w/w | MEG in water | MEG in PET |
|---|---|---|---|---|---|---|
| 10.0 | 0.27 | 79.0 g | 0.49 l | 2.63% | 30.0 mg/l | 0.018% |

Table 4 provides typical properties for dried PET flakes. As can be seen the amount of diethylene glycol is about 1.5-1.6%. Since at the end of the extruder the amount measured typically was about 1.5-1.6% it is reasonable to conclude that no DEG was produced in the extruder.

TABLE 4

Typical values for dried PET flakes

| Moisture | IV | Ec mmol/kg | DEG | AA mg/kg |
|---|---|---|---|---|
| 0.02% | 0.75-0.85 | 28-30 | 1.5-1.6% | 0.8-2.5 |

DEG = diethylene glycol; Ec = amount of free carboxyl groups; AA = acetaldehyde

In summary, depolymerization of PET to oligomers with monoethylene glycol by reactive extrusion has been performed in a range of 10-20 kg/h. The limits within which an efficient depolymerization process can take place have been established for these different capacities. Under the existing conditions, up to 3% MEG could be properly dosed on the standard extruder. Control of the moisture content of the PET flakes has been achieved by pre-drying and applying degassing by vacuum to the extruder. This limited the hydrolysis of PET during the melting process, with the carboxyl end groups increasing by +7 mmol/kg.

Additional diethylene glycol formation could not be demonstrated in the test series. The added MEG was almost completely taken up during depolymerization. The speed of the extruder screw has an influence on the process. At a capacity of 20 kg/h, a higher speed gives a higher viscosity, believed to be due to the fact that the increase in transport counteracts the effective reaction with MEG. At a lower capacity, a higher screw speed contributes to better mixing with MEG. When the speed of the screw is too low, instability of the depolymerization process is seen, and MEG may be released.

Example 2

Example 2 provides various experiments, including a two stage depolymerisation process according to the invention. In particular, this example provides results achieved with glycolysis using MEG as a reactant for depolymerising PET in a single screw extruder (see FIG. 2) and in combination with a CSTR configured as a continuous process.

Clear PET flakes made of PET bottles were used for the experiments. The basic properties of the PET waste are listed in Table 5. When not dried, the moisture content is about 1% w/w. This moisture is present mainly because of the pre-treatment of the flakes for cleaning.

TABLE 5

Analysis of the starting material

| Nr | moisture % m/m | viscosity IV | Ec Meq/kg | DEG % | AA % | Remarks |
|---|---|---|---|---|---|---|
| 1 | 0.757 | 0.755 | 27.5 | 1.57 | 2.45 | Not dried |
| 2 | 0.023 | 0.750 | 28.5 | 1.50 | 1.27 | Dried |
| 3 | 0.170 | 0.764 | 28.4 | n.d. | n.d. | After 24 h of exposure to air |

Ec = amount of free carboxyl groups;
DEG = diethyleneglycol;
AA = acetaldehyde

Table 6 shows the results of PET melting using dried and undried material. The more PET is dried, hydrolysis, and so the formation of carboxyl end groups (Ec), will have less influence on the glycolysis process and ultimate repolymerization process.

Because any (small) amount of moisture may already cause hydrolysis, the PET is kept dry during dosing of PET in the extruder. This is done by keeping the PET under dry nitrogen. To underline this, in table 5 (see no. 3) the effect of moisture absorption from the air can be seen after sample no. 2 is exposed for 24 hours to regular air.

TABLE 6

Hydrolysis of dried and non-dried PET (Tm = 268° C.)

| Sample Nr | PET Kg/h | MEG Kg/h | Viscosity IV | Ec meq/kg | Description samples |
|---|---|---|---|---|---|
| 1 | 10.0 | 0 | 0.38 | 83 | Not dried, no vacuum |
| 2 | 10.0 | 0 | 0.57 | 44 | Not dried, vacuum |
| 3 | 10.0 | 0 | 0.60 | 39 | Dried, vacuum |

Reactive extrusion tests were performed using up to 3% w/w MEG with dried PET flakes. The glycolysis process took place very rapidly. The PET was depolymerized into oligomers within 30 seconds. The dosed MEG had almost completely reacted in this time frame. Over 98% of the dosed MEG had been used for the glycolysis process. Table 7 shows the analysis results of the glycolysis process. To increase the performance larger amounts of MEG have been dosed continuously in combination with a Reactor (indicated as "+ CSTR").

About 2% w/w MEG is added to the extruder and an additional amount in the CSTR, if applicable. By choosing a filling of 10 kg in the CSTR, an average residence time of 1 hour was realized at 270° C. at a capacity of 10 kg/h PET. Steady state was reached by a total dosing of ±12% MEG w/w. The entire glycolysis process was carried out without additional catalyst. A viscosity (IV) as low as 0.07 could be achieved. However, even a viscosity of about 0.09-0.1 is sufficiently low to allow (micro) filtration. At a dosing of 12%, a percentage of 2-3 free MEG could still be detected in the oligomer ester. The relatively high proportion of carboxyl end groups caused by hydrolysis was probably due to moisture present in the MEG. This can be avoided by drying the MEG.

TABLE 7

Glycolysis of dried, clear PET flakes (Tm 266° C.)

| Sample Nr | PET Kg/h | MEG Kg/h | Viscosity after CSTR IV | Ec meq/kg | MEG free % | Remarks |
|---|---|---|---|---|---|---|
| 1 | 10.0 | 0.12 | 0.209 | 35.8 | n/a | |
| 2 | 10.0 | 0.18 | 0.173 | 35.3 | n/a | |
| 3 | 10.0 | 0.22 | 0.157 | 34.8 | n/a | |
| 4 | 10.0 | 0.29 | 0.145 | 35.1 | n/a | |
| 5 | 10.0 | 0.31 (3%) | 0.124 | 32.8 | n/a | |
| 6 | 10.0 | >2 (>20%) | 0.072 | 112 | 2.9 | +CSTR |
| 7 | 10.0 | 1.23 (12%) | 0.071 | 95 | 2.3 | Two extruders + CSTR |

The HPLC analysis results in Table 8 show a significant amount of BHET to tetramer when applying 12% MEG or more. However, in order to be able and filter the melt, it is not necessary to depolymerize this far. A viscosity of (IV=±) 0.1 is sufficient for the filtration process. This corresponds to a 8-10 (octa-deca) oligomer. This will require 5% to 8% MEG w/w.

TABLE 8

Analysis of the oligomers (relative to pure BHET)

| Sample | BHET | dimer | tri-mer | tet-ramer | pen-tamer | hex-amer | heptamer | oc-tamer |
|---|---|---|---|---|---|---|---|---|
| 6 | 12.6 | 17.1 | 14.3 | 12.0 | 6.1 | 1.8 | 0.6 | 0.4 |
| 7 | 10.3 | 14.9 | 13.8 | 10.2 | 5.1 | 1.4 | 0.4 | 0.3 |

What is claimed is:

1. A process to enable the recycling of a stream of polyester waste material by depolymerizing the polyester by alcoholysis, the process comprising:
   at least a first stage of depolymerization and
   a separate second consecutive stage of depolymerization, to which first and second stages the stream of polymer waste material is subjected in a continuous manner,
   in the first stage of the two consecutive stages, continuously feeding the stream of polyester waste material to an extruder operated at a temperature above the melting temperature of the polyester, while co-feeding a first amount of alcohol to the extruder, in order to produce a fluid mixture comprising a melt of the at least partly depolymerized polyester; and
   in the second stage, continuously feeding said fluid mixture to a continuously stirred tank reactor (CSTR) operated at a temperature above the melting temperature of the polyester, while co-feeding a second amount of alcohol to the CSTR, wherein a residence time in the CSTR is used to provide at the outlet of the CSTR a continuous stream of polyester depolymerized into an oligomeric ester.

2. A process according to claim 1, wherein the total amount of alcohol of the first and second amount of alcohol, is between 3 and 12% w/w with respect to the stream of polyester material.

3. A process according to claim 2, wherein the first amount of alcohol is between 1 and 5% w/w with respect to the stream of polyester material, and the second amount of alcohol is between 2 and 8% w/w with respect to the stream of polyester material.

4. A process according to claim 1, wherein the first stage comprises first and second separate consecutive sub-stages, wherein each of the first and second sub-stages comprises a corresponding extruder, and further comprising the step of:
   operating each extruder at a temperature above the melting temperature of the polyester, while co-feeding an amount of alcohol to each extruder, to produce the fluid mixture fed to the CSTR.

5. A process according to claim 4, further comprising the step of feeding the alcohol to the extruder of the first sub-stage, in one of:
   a distal 20% of the extruder length,
   a distal 5-15% of the extruder length, or
   at 10% of the extruder length.

6. A process according to claim 4, further comprising the step of feeding the alcohol to the extruder of the second sub-stage, in one of:
   the middle 30-70% of the extruder length,
   the middle 40-60% of the extruder length, or
   at 50% of the extruder length.

7. A process according to claim 4, further comprising the step of feeding the amount of alcohol in the extruder of the first sub-stage between 0 and 2% w/w with respect to the stream of polyester material and the amount of alcohol fed in the extruder of the second sub-stage between 1 and 5% w/w with respect to the stream of polyester material.

8. A process according to claim 4, wherein the extruder of the second sub-stage is a single screw extruder.

9. A process according to claim 1, further comprising, prior to the two consecutive stages, a step of drying the stream of polyester waste material to reduce the amount of water in the stream to less than 5000 ppm.

10. A process according to claim 9, wherein an amount of water in the stream is one of:
    between 10 and 1000 ppm,
    between 20 and 100 ppm, or
    around 50 ppm.

11. A process according to claim 1, further comprising the step of controlling the amount of alcohol fed in the first stage of the process by measuring a viscosity of the fluid mixture fed to the CSTR and adjusting the amount of alcohol to arrive at a predetermined value for said viscosity, which predetermined value is an intrinsic viscosity (IV) between 0.1 and 0.2 dl/g.

12. A process according to claim 1, further comprising the step of controlling the amount of alcohol fed in the second stage of the process by measuring a viscosity of the stream of oligomeric ester and adjusting the amount of alcohol to arrive at a predetermined value for the viscosity, which predetermined value is an intrinsic viscosity (IV) between 0.09 and 0.1.

13. A process according to claim 1,
    wherein the polyester is polyethylene terephthalate (PET),
    wherein residence time in the CSTR is such that the oligomeric ester for over any one of 50% w/w, 60% w/w, 70% w/w, 80% w/w or even 90% w/w, comprises oligomers of one of:
    4 to 16 Bis(2-Hydroxyethyl) terephthalate (BHET) units,
    6 to 14 (BHET) units, or
    8 to 10 (BHET) units.

14. A process according to claim 1, further comprising the step of heating the continuous stream of oligomeric ester to an elevated temperature above the melting temperature of the polyester while subjected to a vacuum below one of:
  10 mbar,
  5 mbar,
  between 0.5 and 2 mbar, or
  around 1 mbar,
to induce repolymerisation, to arrive at a repolymerised amorphous polyester, having an IV between 0.4 to 0.6.

15. A system for recycling a stream of polyester waste material by depolymerising the polyester by alcoholysis, the system comprising:
  an in line arrangement of first through third consecutive reactors for conducting a continuous process inducing alcoholysis of the polyester,
  wherein the first reactor is a twin screw extruder having a feeding entrance for feeding an alcohol in the distal 20% of the twin screw extruder length,
  wherein the second reactor is a single screw extruder having a feeding entrance for feeding an alcohol in the middle 30-70% of the single screw extruder length, and
  wherein the third reactor is a continuous stirred tank reactor having a feeding entrance for feeding an alcohol.

* * * * *